(No Model.)
E. A. SPERRY.
APPARATUS FOR DISTRIBUTING ELECTRICAL POWER.
No. 361,843. Patented Apr. 26, 1887.
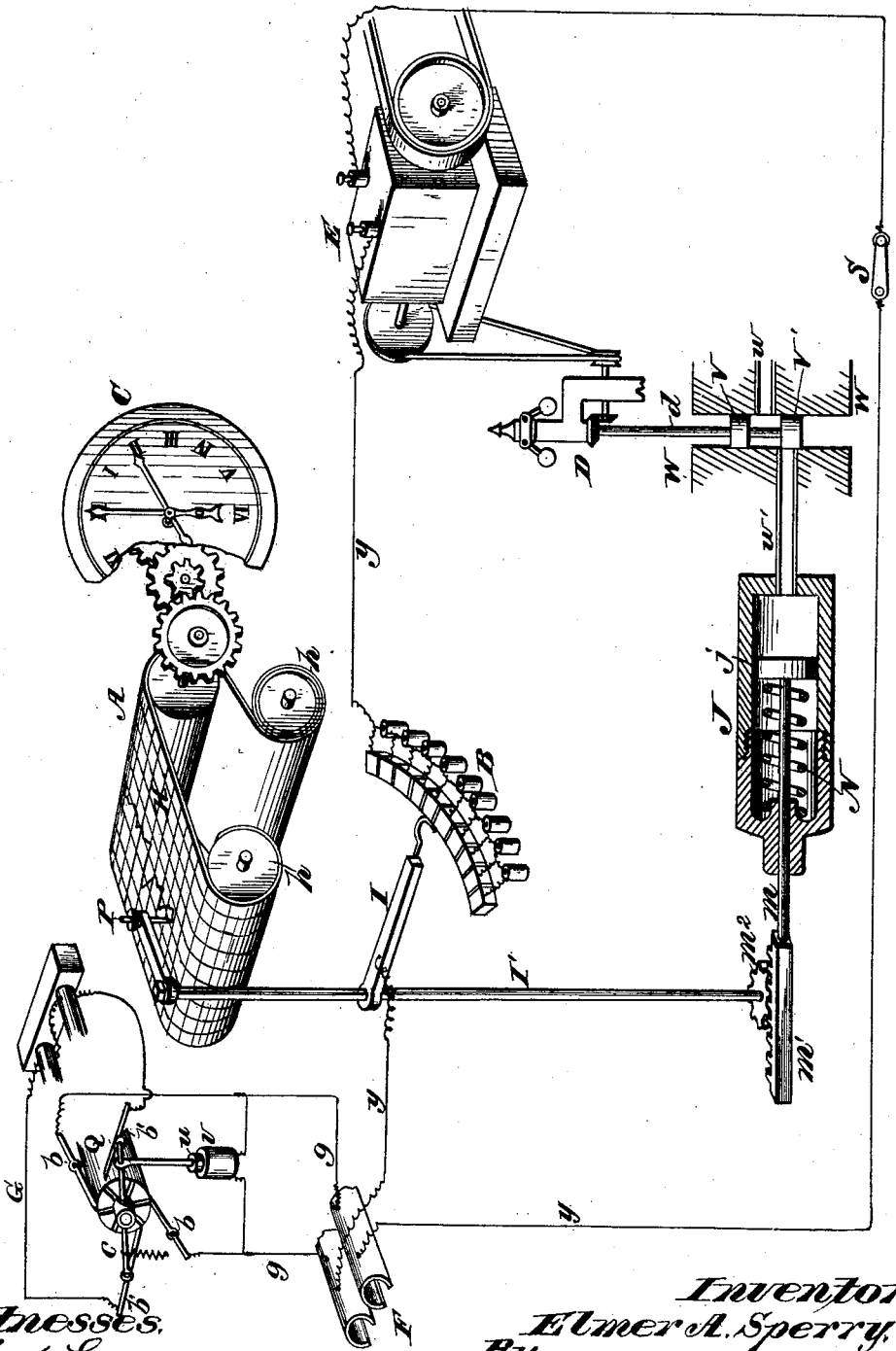
Witnesses:
Robert Enatt
J. A. Rutherford
Inventor:
Elmer A. Sperry,
By James L. Norris,
Atty.

UNITED STATES PATENT OFFICE.

ELMER A. SPERRY, OF CHICAGO, ILLINOIS.

APPARATUS FOR DISTRIBUTING ELECTRICAL POWER.

SPECIFICATION forming part of Letters Patent No. 361,843, dated April 26, 1887.

Application filed May 21, 1886. Serial No. 202,898. (No model.)

*To all whom it may concern:*

Be it known that I, ELMER A. SPERRY, a citizen of the United States, residing at Chicago, in the county of Cook and State of Illinois, have invented new and useful Improvements in Apparatus for Distributing Electrical Power, of which the following is a specification.

The object of this invention is to facilitate the distribution of electrical power for industrial purposes. It is designed, chiefly, for the purpose of utilizing the electric mains of electric railways as sources from which service-circuits may be derived at points or stations where electric power is desired to be used.

The invention consists in certain novel combinations and arrangement of devices whereby electrical power may be derived from the mains, applied to use, measured, and automatically regulated; and it consists also in the combination, with the mains and subsidiary service-circuits, of a main generator provided with regulating devices whereby the charging of the mains is maintained in a manner commensurate with the demands upon the current.

The accompanying drawing is a diagram illustrating an arrangement of devices in accordance with my invention.

The letter F indicates a portion of the mains of an electric railway, and G is a sufficient representation of a dynamo-electric generator, for the purpose of illustrating the principle of my invention in connection with the other devices. This generator is connected with the mains by conductors $g\ g$, and is provided with means, which will be hereinafter described, for regulating the strength of the current on the main circuit.

The letters $y\ y$ indicate the wires or line-conductors of a service-circuit which is a derivation from the mains. In this service-circuit is included an electromotor, E, which may be used for driving any suitable machinery, and in the present instance is the means of using the electric power which is supplied by the service-circuit from the mains.

In the service-circuit is included a rheostat, B, the arm I for regulating the resistance of which is carried by a rod, I', which at its upper end is provided with an arm, L, carrying a recording-pencil, P, which is arranged to mark upon a moving record-sheet, H. This sheet is carried by rollers $h\ h$, and is propelled by a driving-roller, $h'$, which is geared with the train of a clock, C. The sheet H is graduated or divided into spaces corresponding to the time graduations of the clock-dial, and the gearing is so arranged that a given space or length of the sheet which passes under the pencil corresponds to a given interval of time.

The lateral excursion of the pencil as the resistance in the service-circuit varies produces a sinuous or zigzag line on the paper, and the amplitude of the curves or bends in this line with respect to proper longitudinal graduation or division lines will indicate the amount of electrical energy on said derived circuit.

In arranging the longitudinal graduation-lines of the sheet there are two factors to be considered, the product of which is the amount of electrical energy and is indicated by these graduation-lines. One of these factors is the potential of the main, and is considered a constant. The other factor is the resistance in the service-circuit, and is a variable. With these two factors it is experimentally determined what quantity of electrical energy flows from the main over the service-circuit with each of a graduated series of resistances interposed in said circuit, and the number of "watts" for a given number of ohms resistance is marked on the graduation-line of the sheet at which the pencil stands when that amount of resistance is in the said service-circuit. It will be seen, then, that an inspection of the sheet will show what amount of electrical energy has been during any period of time derived from the main by the service-circuit.

In the drawing I have shown the paper with longitudinal and transverse rulings; but obviously this is not sufficient to indicate the precise graduations of the sheet transversely for time and longitudinally for electrical energy, as such illustration in this drawing could of course be no guide for the location of the graduation-lines in practice. The instructions given, however, will be amply sufficient to enable the proper marking of the sheet by any one familiar with electrical measurements and apparatus therefor. The amount of energy required on the service-circuit varies, of course, with the duty required of the motor, and in order to regulate the current on the said service-circuit the motor is connected with a governor, (shown at D,) which operates longitudinally a rod, $d$, which carries two plunger-valves, V and V', which play in a cylinder, W, shown in section. Into this cylinder, at a point between the two valves, leads a supply-pipe, $w$, which is to be connected with a source of constant fluid-pressure. The cylinder W is connected by a pipe, $w'$, with a cylinder, J, in which is placed a plunger, J', connected to a piston-rod, $m$, which carries a rack-bar, $m'$, meshing with a gear-wheel, $m^2$, which is fixed upon the rod I', which carries the regulating-arm I of the rheostat and the pencil-carrying arm L of the recorder.

It will be observed that the movement of the plunger J' in the cylinder J will cause the rod I' to be turned so that its arm I will throw more or less resistance of the rheostat into circuit, and the pencil-arm will be simultaneously swung so that the position of the pencil-mark on the traveling record-sheet will show the resistance of the circuit at the time indicated by the graduations of said sheet.

The letter S indicates a switch by which the service-circuit may be closed or opened.

When the motor E is running at a normal speed, the governor holds the valve-rod $d$ so that the valve V' will close the pipe $w'$ with a given amount of fluid in the cylinder J behind the plunger J', which thus holds the rod I' and arm I in proper position to include a proper amount of resistance in the circuit. Now, if the load of the motor should be increased, this would tend to decrease its speed should the energy supplied be not proportionately increased, and thus the centrifugal action of the governor would be lessened and the valve V' raised, so that a portion of the liquid would be exhausted from the cylinder J and the spring N allowed to force the plunger inward, thus turning the rod I so as to decrease the amount of resistance at the rheostat and correspondingly increase the amount of energy. The position of the pencil P is at the same time changed to indicate the increase of energy by the new position of its mark. Of course if the load of the motor should be lightened the governor would tend to run faster and press down the valve V', so as to open communication between the pipe $w'$ and supply-pipe $w$, and more liquid would be forced into the cylinder J and its plunger operated to turn the rod I' and shift arm I to throw in more resistance and reduce the energy in proportion to the reduction of load.

The generator G automatically accommodates the energy supplied to the mains in accordance with the demands thereupon.

The letters $b\ b$ designate the brushes of the external circuit of the generator, and $b'\ b'$ are brushes of an independent circuit, which includes the coils of the field-magnets. These brushes $b'\ b'$ are fixed upon an equal-armed lever, $c$, which is pivoted upon the shaft of the commutator Q, and this arm $c$ is connected with the movable core $u$ of an axial magnet, U, the coil of which is included in a circuit derived from the external circuit of the machine. If the demands upon the main reduce the energy thereon, the magnet U releases its core and the brushes $b'\ b'$ are shifted closer to the points of maximum effect upon the commutator, and the excitation of the field-magnets is increased, and the strength of the induced current on the external circuit is therefore correspondingly increased. If the demand upon the mains should become less instead of greater, a reverse action would be produced, as will be readily understood. The regulating devices of the generator form the subject of an application filed by me March 14, 1883, No. 88,130.

It is to be understood that any number of derived circuits and connected devices may be connected with the mains, and any kind of electric motor or machine may be used on such derived circuit for utilizing the electric power.

Having thus described my invention, what I claim is—

1. The combination, with the main and derived circuit, of an electric motor included in said derived circuit, regulating devices operated by said motor for controlling the amount of electrical energy on the derived circuit, and an automatic device for registering the increase and decrease of resistance in said derived circuit, substantially as described.

2. The combination, with a system of electric-railway mains, of means for deriving electrical energy from said mains over a subordinate circuit and means included in said subordinate circuit for automatically varying and recording the variations of electrical resistance in said circuit, substantially as described.

3. The combination, with the mains F, of the derived circuit, the motor included in said derived circuit, the rheostat, also included in said derived circuit, the recording apparatus controlled by time mechanism, the governor connected with and operated by the motor, and intermediate devices controlled by said governor for operating the adjusting devices of the rheostat and the pencil of the recorder, substantially as described.

4. The combination, with a system of electric-supply mains, of means for deriving electrical energy from said mains over a subordinate circuit, and means included in said subordinate circuit for automatically varying and recording the variations of electrical energy on said circuit, substantially as described.

5. The combination, with a system of electric-supply mains, of means for deriving electric energy from said mains over a subordinate circuit, and means included in said subordinate circuit for automatically varying the electric energy on said circuit and recording data indicating said variations, substantially as described.

In testimony whereof I affix my signature in presence of two witnesses.

ELMER A. SPERRY.

Witnesses:
A. M. TANNER,
J. A. RUTHERFORD.